Figure 1:
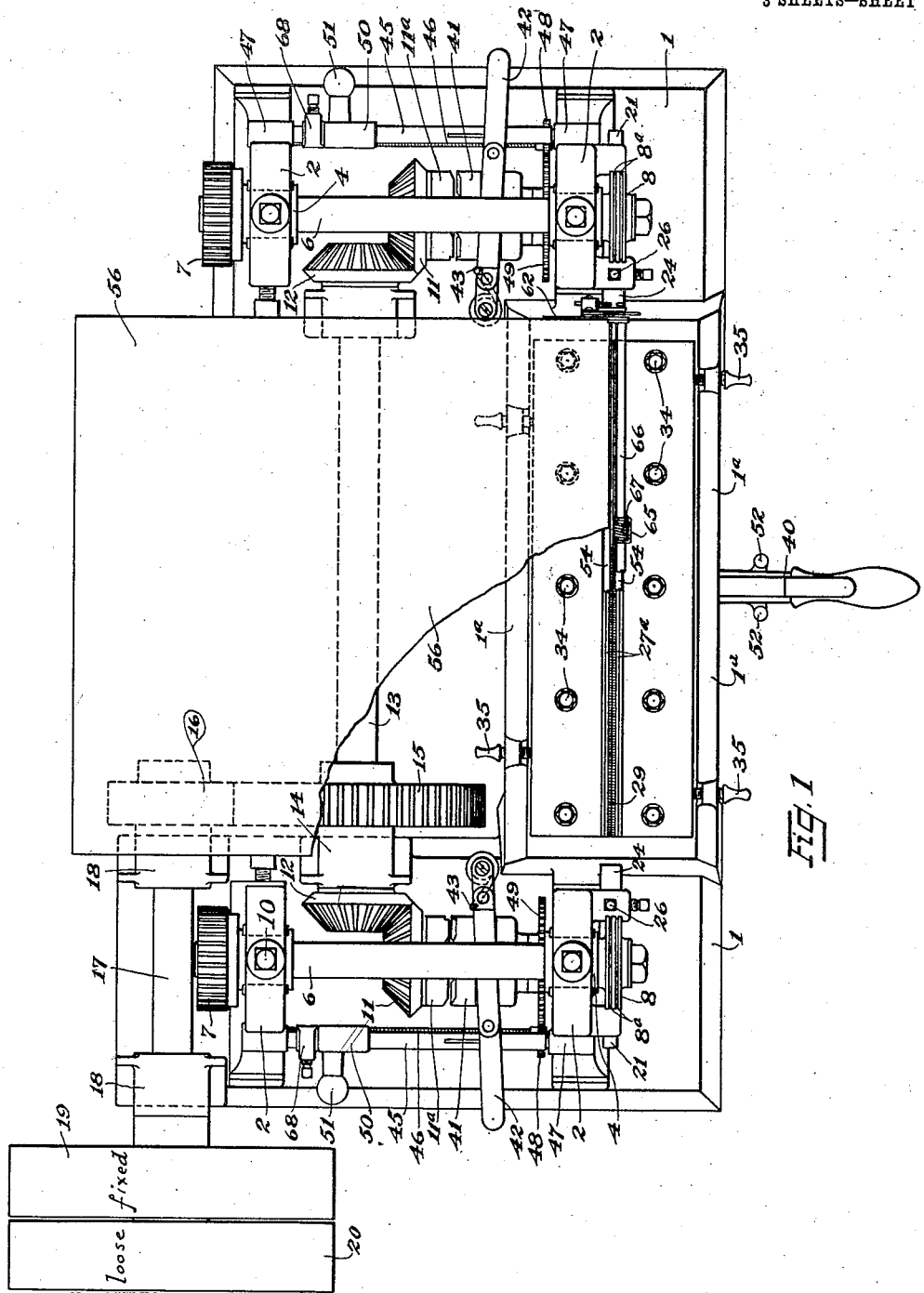

W. H. EYNON.
MACHINE FOR MAKING CHAIN MESH.
APPLICATION FILED DEC. 27, 1909. RENEWED JULY 26, 1912.

1,086,810.

Patented Feb. 10, 1914.

3 SHEETS—SHEET 1.

Witnesses:
F. C. Valentine
A. C. Otters

Inventor:
Wm. H. Eynon,
by Obed C. Billman
Attorney.

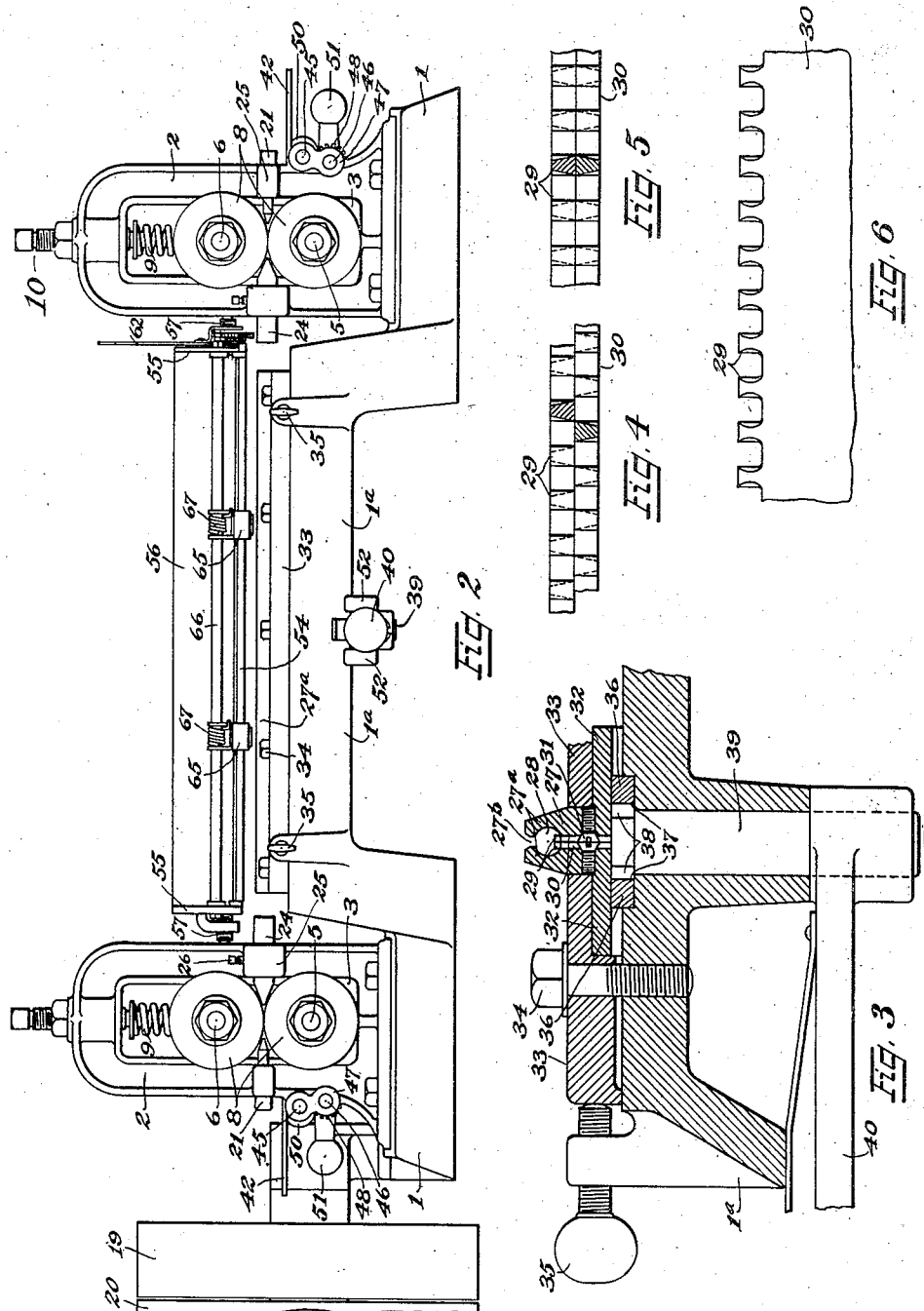

W. H. EYNON.
MACHINE FOR MAKING CHAIN MESH.
APPLICATION FILED DEC. 27, 1909. RENEWED JULY 26, 1912.
1,086,810.
Patented Feb. 10, 1914.
3 SHEETS—SHEET 3.
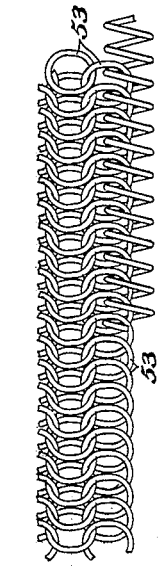
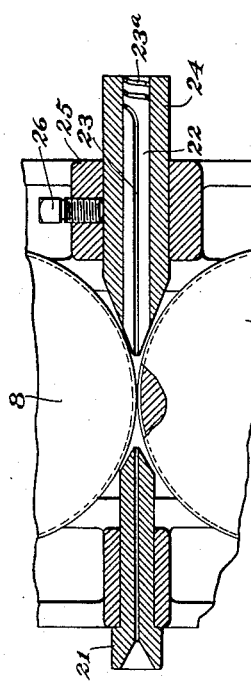
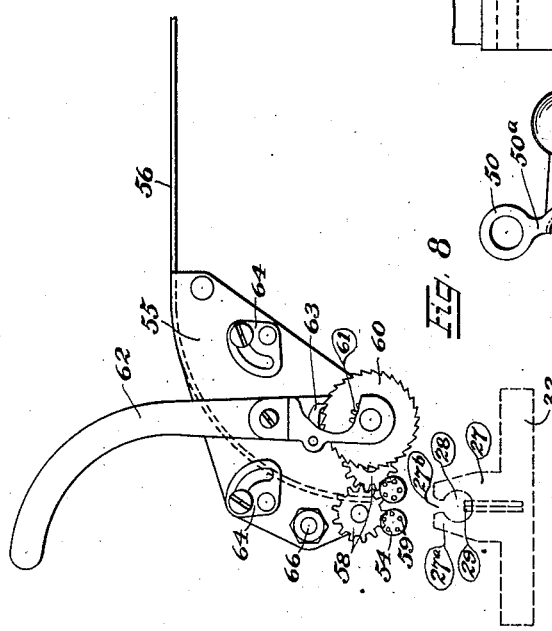
Witnesses:
F. C. Valentine
U. C. Otters
Inventor:
Wm. H. Eynon,
by Fred B. Billman
Attorney.

UNITED STATES PATENT OFFICE.

WILLIAM H. EYNON, OF CLEVELAND, OHIO.

MACHINE FOR MAKING CHAIN MESH.

1,086,810. Specification of Letters Patent. Patented Feb. 10, 1914.

Application filed December 27, 1909, Serial No. 535,196. Renewed July 26, 1912. Serial No. 711,732.

*To all whom it may concern:*

Be it known that I, WILLIAM H. EYNON, a citizen of the United States, residing at Cleveland, in the county of Cuyahoga and State of Ohio, have invented certain new and useful Improvements in Machines for Making Chain Mesh, of which the following is a specification.

My invention relates to improvements in machines for making chain-mesh, the present embodiment of the invention being particularly designed for the manufacture of chain-mesh for use as a flexible armor such as that disclosed in my patent for an armored tire, granted July 12, 1910, No. 963,882.

Owing to the laborious processes or methods of manufacture of chain-mesh now in use the prices of such chain-mesh are such as to render its use prohibitory as an armored fabric in tires, and for use in other arts. The greater quantity of chain-mesh now on the market is made by hand, and the primary object of this invention is to provide a generally improved machine for the manufacture of chain-mesh which will be exceedingly simple in construction, efficient in operation, and adapted to improve and cheapen the product for the purposes above referred to.

The wire used for the manufacture of chain-mesh as a flexible armor for use in pneumatic tires is of about 22 gage, (Birmingham) and approximately 28/1000 of an inch in diameter, and the chain-mesh as produced by this machine is of exceedingly close-mesh, the rings or links being of approximately 3/16 of an inch outside diameter. The principles of the machine, however, are such that the relative size and proportion of the parts may be readily modified for the production of chain-mesh of any desired mesh and gage.

With the above mentioned ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1 is a top plan view of a machine constructed in accordance with this invention. Fig. 2, a side elevation of the same. Fig. 3, an enlarged cross-sectional view of the coil-receiving guide and cutting members and the adjacent bed or frame. Fig. 4, a greatly enlarged top plan view of the cutting members showing the relative position of the guide cutting teeth when the guide members are being shifted during the cutting and forming of the intermediate coils into rings while the helix or entire length of coil is held between the guide members. Fig. 5 is a similar view showing the cutting teeth of the cutting members in their normal or registering position and acting as guide-teeth for receiving and containing rings or convolutions of the helix as formed and projected between the guide members from the spiral forming die or wire coiling mandrel. Fig. 6, a side elevation of a portion of one of the cutting members. Fig. 7 is a longitudinal sectional view of the wire feed guide and the coiling die or mandrel in their relative position with respect to the wire feed-rolls. Fig. 8, an end view of the mechanism for elevating the formed rings from the guide members and holding the same in proper position to receive the respective coils or convolutions of the forming helix as the latter traverses the coil or helix receiving-groove or passageway in the subjacent guide members. Fig. 9, an enlarged detail view of the coil forming die or mandrel. Fig. 10, a greatly enlarged view of a portion of the completed chain-mesh illustrating the manner in which the last formed series or row of rings are held for the reception of the rings or convolutions of the forming helix as the latter is projected through the coil or helix receiving-groove or passage-way of the subjacent guide members. Fig. 11, a view of the carriage mechanism for automatically releasing the clutch mechanism when the wire helix has reached a predetermined point in the helix guide members. Fig. 12 is an end view of the carriage block.

Similar numerals of reference designate like parts throughout all the figures of the drawings.

The improved machine in its present embodiment comprises a bed or frame 1, consisting, in the present instance, of end bearing portions connected by an intermediate elevated or bridge portion 1ª. The end bearing portions 1 are each provided with a pair of housing-frames or standards 2, each of said housing-frames being provided with the usual bearing guide ways containing lower stationary bearings 3, and upper movable bearings 4. The lower or stationary bearings 3 are provided with a driving-shaft 5, and the upper or movable bearings 4 are provided with a vertically movable or second shaft 6. The shafts 5 and 6 are geared together by means of gear-wheels 7 at one end, and are provided at their other end with wire feed-rolls 8. Each of said feed-rolls is provided about its periphery with a pair of wire-receiving bearing grooves 8ª, said feed rolls being interchangeably mounted upon the ends of the shaft so that should one of the bearing grooves become worn the feed-roll may be reversed so as to bring the companion bearing groove into use. As a means for adjusting the upper or second shaft 6, and particularly the tension of the upper feed-rolls upon the lower feed-rolls, tension springs 9 are interposed between the movable bearings 4 and tension adjusting bolts 10, adjustably mounted in the upper portions of the housings 2, in a well known manner.

As a means for driving the feed-rolls 8, the driving-shafts 5, are provided with loose bevel-gears 11, adapted to drive suitable clutch mechanism, hereinafter described, said bevel gears meshing with a second set of bevel-gears 12, carried upon a longitudinally extending driving shaft 13, mounted in suitable bearings 14, on the bed 1. The shaft 13, is driven by means of a gear-wheel 15, meshing with a pinion 16, carried upon one end of a main driving shaft 17, mounted in suitable bearings 18, at the rear of one of the bearing ends of the frame. The main driving-shaft 17, is provided at one end with a fixed driving pulley 19, and an idle or loose pulley 20, said pulleys being adapted to carry a belting communicating with any suitable and convenient source of power.

The wire feed-rolls 8 are adapted to be alternately thrown into and out of gear with the driving mechanism, as hereinafter described, and the wire is adapted to pass through suitable guides 21, in front of each pair of feed-rolls, said guides acting to direct the wire in proper position between the bearing grooves, and as the wire passes between the bearing grooves 8ª of the feed-rolls the latter force the wire through the spiral forming dies or coiling mandrels 22 at the rear. The coiling mandrel is provided on its periphery with a longitudinally extending groove 23, adapted to receive the wire as fed from the feed-rolls 8, said groove terminating in a spirally arranged portion 23ª, so as to form, in connection with the incasing shell or supporting sleeve 24, the necessary spiral path for the wire as the same is forced therethrough by means of the feed-rolls. The supporting sleeve is removably mounted and secured in a bearing-lug 25 by means of a set-screw 26. The coiling mandrels 22 may be keyed or otherwise removably secured within the supporting sleeves 24 as desired.

As a means for holding and securing the formed spiral coil or helix in proper position during the chain-mesh forming operation, as hereinafter described, a pair of guide members 27, are slidably mounted on the intermediate or bridge portion 1ª, of the bed, as hereinafter described, said guide members being provided with upwardly extending flange or jaw portions 27ª, extending intermediate the coiling mandrels 22, as shown most clearly in Fig. 2, of the drawings. The jaw portions of the guide members are grooved on their inner sides so as to form an intermediate coil or helix receiving groove 28, the ends of said receiving groove being in the same plane with said coiling mandrels and being adapted to receive the formed coil or helix as projected therefrom.

Cutting guide-teeth 29 project or extend into said helix-receiving groove, said guide-teeth being formed, in the present instance, along the edge of a pair of cutting members 30, abutting against each other and secured, in the present instance, on the inner sides of said guide members by means of a series of screws 31. The guide members 27 are provided with friction-bearing base portions 32, confined and sliding within friction ways of adjustably mounted guide-plates 33. The guide members 27 are adapted to be adjusted with respect to each other by means of the adjustably mounted guide-plates through the medium of the adjusting-bolts 34 and adjusting thumb-bolts 35.

As a means for reciprocating the guide members 27, in opposite directions, together with the attached cutting guide teeth 29, the base portions of the guide members are provided with depending plates 36, provided on their inner sides with oppositely disposed friction bearing recesses 37, said friction recesses containing oppositely disposed friction-lugs 38, on one end of a vertically arranged shaft 39. The lower end of the shaft 39, is provided with an operating lever 40, projecting in front of the bed portion 1ª, of the machine by which lever the shaft 39, may be oscillated whereby the guide members 27, and attached cutting teeth may be reciprocated in an obvious manner. When the operating lever 40, extends in its normal position as indicated in the drawings the cutting guide-teeth 29, are in registry with each other as shown in Fig. 5, and as the formed coil or helix is projected from one of the coiling mandrels it passes into the coil or helix receiving-groove 28, and during its revolution and traverse of said intermediate receiving-groove of the guide members each coil or convolution passes through the intermediate space between the guide-teeth 29.

As a means for alternately throwing the feed-rolls into and out of gear with the driving mechanism whereby the formed coil or helix may be passed into the helix receiving groove 28, from opposite ends during the chain-mesh making operation, as hereinafter described, each driving shaft 5, is provided with a jaw clutch 41, normally held out of gear by means of a spring resisted shifting lever 42. When it is desired to throw the respective gear-wheels into engagement with the respective driving gears, the shifting lever 42, is shifted manually toward the gear wheels whereby the jaw clutch 41, is shifted into engagement with the adjacent jaw-collar portion 11ª, of the adjacent bevel-gear 11, said shifting lever being automatically engaged and held when thus manually shifted by the means now described. As a means for holding the shifting lever 42, against the resistance of the lever spring 43, so that the clutch will be held in its engaged position for the desired length of time, as hereinafter explained, a spring resisted trip latch 44, is pivotally mounted in a recess of a horizontally extending carrier shaft 45, said spring latch being adapted to automatically engage the free end of said lever when manually shifted as above mentioned.

As a means for releasing the shifting lever 42, and thus throwing the respective feed-rolls 8 out of operation when the wire helix has been projected to the opposite end of the guide groove 28 of the guide members 27, a threaded timer shaft 46 is mounted beneath the carrier shaft 45 in lugs 47, said threaded shaft being revolved by means of a pinion 48, meshing with a gear-wheel 49, carried by the adjacent driving-shaft 5. A carriage block 50 is slidably mounted upon the carrier shaft 45, and is adapted to be longitudinally driven on the carrier shaft 45 by means of a depending portion 50ª, having a threaded face held in engagement with the threaded timer shaft by means of a counter-weighted lever 51. As the carriage block travels along the carrier shaft it is adapted during the concluding portion of its travel to engage the bevel portion 44ª of the trip latch and depress the latter whereby the same disengages the shifting lever 42, and the lever spring 43 throws the jaw-clutch out of engagement thereby stopping the respective feed-rolls at the point desired. The operator then moves the operating lever 40, to one side until one of the stops 52, is brought into engagement with the adjacent bed portion 1ª, this movement reciprocating the cutting members in opposite directions whereby the guide cutting teeth 29, are thrown out of their registering position to cut the intermediate coils or convolutions of the helix. Fig. 4, shows the intermediate position of the cutting teeth 29, just after having severed the intermediate coils or convolutions of the helix. This position of the guide cutting teeth takes place during the intermediate travel of the operating lever 40, and a further movement of the operating lever 40, carries the guide cutting teeth to a further position whereby the adjacent cut ends of the coils or convolutions are brought into registry with each other forming the rings 53 of the chain-mesh. As the elasticity or spring in the rings will have a tendency to retract the adjacent cut ends when relieved of the pressure of the cutting teeth, the throw or reciprocation of the cutting teeth may be regulated so as to carry the adjacent ends slightly past the registering position so that when the cutting teeth are retracted to their normal position the cut ends will be carried by the elasticity of the rings into exact registry with each other. When the rings are thus formed the operating lever is thrown back to its normal position whereby the cutting members 30, are reciprocated to bring the guide teeth 29, into registry with each other as shown in Figs. 1, 2, 3 and 5, of the drawings.

As a means for elevating the formed rings 53, a pair of gripping rollers 54, preferably covered with felt, are mounted immediately above the throat portion 27ᵇ, leading from the helix receiving groove or passage-way 28, of the guide members 27, said gripping rollers 54, being suitably mounted and carried by bearing bracket plates 55, provided with a rearwardly extending plate 56, adapted to conduct or carry the finished chain-mesh to the rear of the machine. The bearing bracket plates 55, together with the attached guide-plate 56, may be supported in any suitable and convenient manner, as by attaching brackets 57, and as a means for revolving the gripping rollers 54, for elevating the formed links and holding the same in proper position for receiving the coils or convolutions of the forming helix as the latter passes through the helix groove or guide-way 28, and through the meshes or openings of the most recently formed rings as indicated in Fig. 10, a pair of meshing toothed wheels 58, may be mounted upon one of the bracket-plates 55, (see Fig. 8), said wheels having their teeth adapted to engage gear teeth or cog-pins 59, on the ends of the gripping rollers, motion being transmitted to said toothed wheels by a ratchet wheel 60, provided with a pinion portion 61, meshing with one of the toothed wheels 58. The ratchet wheel 60, is adapted to be given an intermittent motion by means of a hand lever 62, provided with a pawl 63, for coöperating with the ratchet wheel 60. The length of the throw of the hand-lever 62, is adapted to be limited and regulated by means of adjustably mounted stop plates 64, whereby the elevation of the chain mesh or link fabric, and the most recently formed rings from the throat portion 27ᵇ, of the guide members 27, may be regulated for the purposes hereinbefore referred to. The outer or front gripping roller 54, is carried in depending brackets 65, carried upon a connecting bar 66, extending between the bracket-plates, said depending brackets being adapted to press the outer or front gripping roller 54, toward the opposite or coöperating roller by means of coiled springs 67, on the bar 66, and coöperating with the brackets 65 in an obvious manner, whereby the coöperating gripping rollers 54 are revolved toward each other to engage and elevate the formed links 53 of the fabric below, it being understood that the initially formed row of links or rings upon the commencement of the formation of the fabric may be manually elevated and held in position for receiving the projecting wire helix as hereinafter described and then manually elevated between the gripping rollers 54, after which the fabric may be elevated at intervals by the hand lever 62, in the fabric forming operation.

After the elevation of the formed rings, as above described, the opposite feed-rolls are brought into operation to project the wire helix through the guide members 27, in an opposite direction and through the openings or meshes of the formed rings, as hereinbefore described. Before shifting the respective shifting-lever the counter weighed lever 51, of the carriage block 50, is elevated to bring the threaded face of the depending portion 50ᵃ, out of engagement with the threaded timer shaft 46, so that the carriage block may be shifted or returned to its initial position on the carrier shaft 45, as indicated in the drawings. An adjustable stop block 68, on the carrier shaft 45, is adapted to be adjusted for limiting the movement of the carriage block on the carrier shaft 45.

From the foregoing description, taken in connection with the accompanying drawings, the operation and advantages of my invention will be readily understood.

Having thus described my invention, what I claim and desire to secure by Letters Patent is,—

1. In a machine for making chain-mesh, a helix-receiving guide-way terminating in an outlet throat and provided with reciprocatory cutting guide-teeth projecing into said guide-way.

2. In a machine for making chain-mesh, a pair of reciprocatory guide members forming a helix-receiving groove and provided with cutting guide-teeth extending between said guide-members and adapted to be thrown into and out of registry with each other.

3. In a machine for making chain-mesh, a helix-receiving guide-way provided with guide-teeth and terminating in an outlet throat, and means for forming and projecting a wire helix through said guide-way and between said teeth.

4. In a machine for making chain-mesh, a pair of helix-receiving guide members provided with intermediate reciprocatory guide-teeth extending between said guide-members, and means for spirally projecting a wire helix between said guide-members and teeth.

5. In a machine for making chain-mesh, a pair of guide members forming an intermediate helix-receiving groove and provided with a plurality of guide-teeth extending into said groove, means for spirally projecting a wire helix through and between said groove and teeth, respectively.

6. In a machine for making chain-mesh, a pair of reciprocatory guide members forming an intermediate helix-receiving groove and carrying guide cutting-teeth projecting into said groove, means for spirally projecting a wire helix through and between said groove and teeth, respectively.

7. In a machine for making chain-mesh, a pair of reciprocatory guide members forming a helix-receiving groove and carrying normally registering guide-teeth adapted to be thrown out of registry when said guide members are reciprocated.

8. In a machine for making chain-mesh, helix-receiving guide members provided with reciprocatory normally registering guide-teeth and terminating in an outlet throat opposite said guide-teeth.

9. In a machine for making chain-mesh, guide members affording an intermediate helix-receiving guide-way and provided with a series of reciprocatory normally registering guide-teeth extending into said guide-way.

10. In a machine for making chain-mesh, reciprocatory helix-receiving guide members carrying cutting members provided with normally registering guide-teeth adapted to be thrown out of registry when said guide members are reciprocated.

11. In a machine for making chain-mesh, the combination with a pair of guide members adapted to carry an interposed wire helix; of normally registering reciprocatory guide-teeth extending between the convolutions of said helix, and means for reciprocating said guide-teeth whereby said convolutions are cut and formed into rings.

12. In a machine for making chain-mesh, a pair of helix-receiving guide members, reciprocatory normally registering guide-teeth extending between said guide members, means for forming and projecting a wire helix between said guide members and spirally moving its convolutions between said registering guide-teeth, and means for reciprocating said guide-teeth whereby said convolutions are cut and brought into registry with each other to form rings.

13. In a machine for making chain-mesh, the combination with a pair of helix-receiving guide members provided with guide-teeth, and means for forming and projecting a wire helix between said guide members with its convolutions extending between said guide-teeth; of means for reciprocating said guide-teeth whereby said convolutions are cut and formed into rings, and means for elevating and holding said rings for the reception of the convolutions of the next forming helix.

14. In a machine for making chain-mesh, the combination with a pair of reciprocatory guide members provided with a helix-receiving guide-way and a plurality of guide-teeth extending into said guide-way; of coiling mandrels and feed-rolls adapted to form and project a wire helix along said guide-way with its convolutions traveling between said guide-teeth, means for reciprocating said guide members and teeth whereby said convolutions are cut and formed into rings, and means for elevating and supporting said rings.

15. In a machine for making chain-mesh, a pair of helix-receiving guide members provided with reciprocatory guide-teeth, means for alternately forming and projecting a wire helix between said guide members from opposite ends thereof, means for stopping said helix forming and projecting operation at a predetermined point in said guide members, means for reciprocating said guide-teeth, and means for elevating and holding formed rings from said guide members and teeth whereby the convolutions of the next forming helix are projected through said formed rings.

16. In a machine for making chain-mesh, a bed provided with a helix-receiving guide-way, reciprocatory cutting members provided with registering guide teeth extending into said guide-way, means for forming and projecting a wire helix through said guide-way and spirally moving its convolutions between said registering guide-teeth, means for reciprocating said cutting members whereby said guide-teeth cut the intervening convolutions and bring the cut ends into registry with each other forming rings, and means for elevating and holding said rings whereby the convolutions of the next helix pass through said rings as it traverses said helix-receiving guide-way.

17. A machine for making chain-mesh, comprising a bed, guide members mounted thereon and provided with a coil-receiving groove and an outlet throat, guide-teeth projecting in said coil-receiving groove, coiling mandrels at either end of said groove, feed-rolls at the ends of said mandrels, means for reciprocating said guide-teeth whereby the intermediate coils are cut and formed into rings, and means for elevating each series of rings from said groove and holding the same in proper position to receive the next formed coils as they traverse said groove and pass between said guide-teeth.

18. A machine for making chain-mesh, comprising a bed, a pair of guide members slidably mounted on said bed, a pair of cutting members provided with guide cutting teeth extending between said guide members, a wire coiling mandrel at either end of said guide-members, wire feed-rolls adjacent said coiling mandrels, means for reciprocating said cutting members whereby said cutting-teeth cut each coil and press the adjacent cut ends into registry with each other to form rings, and means for elevating each series of rings when formed.

19. A machine for making chain-mesh, comprising a bed, guide members forming an intermediate coil-receiving groove and an outlet throat, guide-teeth extending into said coil-receiving groove, coiling mandrels at either end of said coil-receiving groove, feed-rolls at the ends of said coiling mandrels, means for driving said feed-rolls, means for reciprocating said guide-teeth whereby the intermediate coils are cut and formed into rings, and means for elevating each series of rings from said coil-receiving groove to said outlet throat whereby the coils next formed are adapted to pass through the formed rings in said throat as they traverse said coil-receiving groove.

20. A machine for making chain-mesh, comprising a bed, reciprocatory guide members mounted thereon and provided with a coil-receiving groove and an outlet throat, guide-teeth carried by said guide members and projecting in said groove, coiling mandrels adapted to form and project a series of coils into said groove and between said guide-teeth, feed-rolls adapted to carry and propel a wire through said mandrels, means for driving said feed-rolls, means for reciprocating said guide members whereby said guide-teeth cut said coils in said groove and form the same into rings, and means for engaging and elevating said formed rings in position to receive the next series of coils as the latter traverse said groove.

21. A machine for making chain-mesh, comprising a pair of helix guide members, reciprocatory guide-teeth extending in a series between said guide-members and normally registering with each other, wire helix forming and projecting mechanism adapted to pass a forming helix between said guide members with their convolutions spirally passing between said normally registering guide-teeth, means for reciprocating said guide-teeth out of registry with each other whereby said convolutions are cut and formed into rings, and means for elevating and holding said formed rings for the reception of the convolutions of the next projected helix.

22. A machine for making chain-mesh, comprising a bed provided with helix-receiving guide members, reciprocatory guide-teeth between said guide members, wire helix forming and projecting mechanism at either end of said guide members, means for alternately bringing said mechanism into and out of operation whereby the forming wire helices are successively passed between said guide members in alternate directions with their convolutions extending between said guide-teeth, means for reciprocating said guide-teeth whereby said convolutions are cut and formed into rings, and means for elevating and holding the rings in position to receive the convolutions of the forming helices as the latter are passed between said guide members.

23. In a machine for making chain-mesh, a helix-receiving guide-way; movable cutting guide teeth projecting therein, and means for moving said teeth into and out of registry with each other.

24. In a machine for making chain-mesh, a pair of helix-receiving guide members, normally registering guide-teeth projecting between said guide members, means for spirally moving therein a wire helix whereby the convolutions thereof pass between said registering guide-teeth, and means for reciprocating said guide-teeth whereby said convolutions are cut and formed into rings.

25. In a machine for making chain-mesh, a helix-receiving guide-way terminating in an outlet throat, a pair of reciprocatory members provided with guide teeth projecting into said guide-way, means for reciprocating said members whereby said guide-teeth are brought into and out of registry with each other, and means for spirally projecting a wire helix through said guide-way with the convolutions thereof passing between said guide-teeth when the latter are in registry with each other.

In testimony whereof I have affixed my signature, in presence of two witnesses.

WILLIAM H. EYNON.

Witnesses:
O. O. BILLMAN,
GEO. H. BILLMAN.